O. L. WILLS.
APPARATUS FOR DETERMINING THE PERIOD OF A PENDULUM.
APPLICATION FILED JUNE 17, 1915.
1,161,568. Patented Nov. 23, 1915.
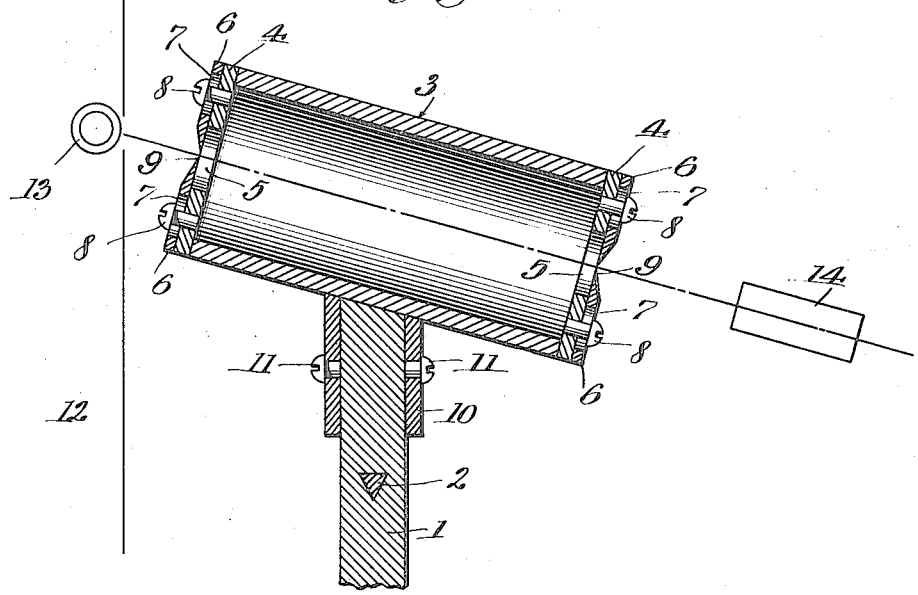
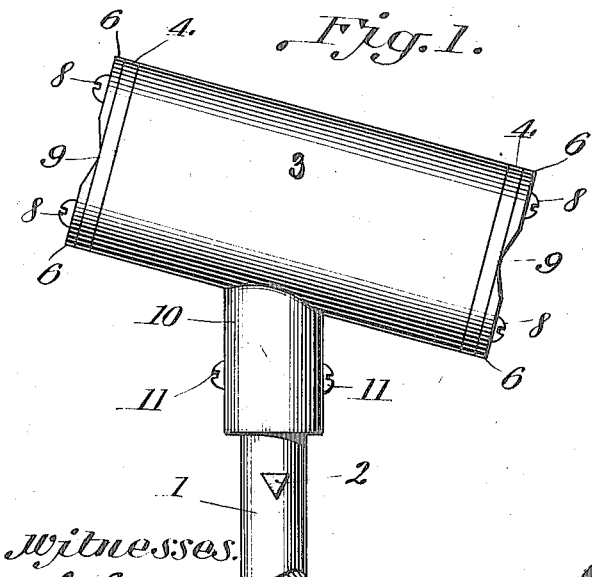
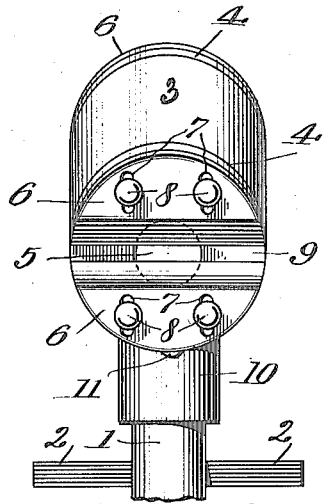

UNITED STATES PATENT OFFICE.

OLIN L. WILLS, OF PORTLAND, OREGON.

APPARATUS FOR DETERMINING THE PERIOD OF A PENDULUM.

1,161,568.  Specification of Letters Patent.  Patented Nov. 23, 1915.

Application filed June 17, 1915. Serial No. 34,703.

*To all whom it may concern:*

Be it known that I, OLIN L. WILLS, a citizen of the United States, residing at Portland, in the county of Multnomah and State of Oregon, have invented certain new and useful Improvements in Apparatus for Determining the Period of a Pendulum, of which the following is a specification.

This invention relates to apparatus for determining the period of a pendulum of a clock by comparison with a standard clock.

There are several methods for determining the period of a pendulum by comparison with a standard clock, but they are unsatisfactory in that they require the observer to make a judgment which is subject to personal error. One of these methods is the co-incidence of a sound with the passing of the certain part of a body past the cross hairs of a telescope; another the image of a lighted Geissler tube making a straight line after reflection from two mirrors one of which is stationary and the other swinging in an arc of a pendulum.

The object of the present invention is to provide a device that will simplify the operation and give strictly accurate results without requiring the exercise of the operator's judgment and requiring only his recognition of an instantaneous flash of light, and thus eliminating the personal reaction which endangers the accuracy of the operation by the old methods.

Other objects such as simplicity in structure, cheapness in manufacture, and the general improvement of the art will be brought out in the following specification and illustrated in the accompanying drawings, in which:

Figure 1 is a side elevation of my device mounted on the upper portion of a Kater's pendulum, Fig. 2 is an end view of Fig. 1, and Fig. 3 is a longitudinal cross-section through the center of Fig. 1, in combination with a peering tube, screen and Geissler tube shown diagrammatically.

Referring more particularly to the drawings, the numeral 1 designates the upper portion of a pendulum swinging from knife edge 2.

The numeral 3 designates the body of the tubular portion of my invention having secured to its ends plates 4, 4, in the center of which are circular holes 5, 5, the diameter of which is about one-half of the diameter of the tube. Semi-circular plates 6 having straight edges are adjustably mounted by means of slots 7 and screws 8 on the plates 4 to permit of the regulation of the size of slits 9. The tube 3 is held on the top of the pendulum by a socket 10 having set screws 11 for holding it in position on the pendulum. A screen 12 is placed near one end of the device and the Geissler tube 13 is placed behind the screen and is in circuit with a small induction coil, not shown, whose primary coil is connected with a battery through the mercury contact of a standard clock, not shown. Opposite the other end of the device is a peering tube 14 focused on the Geissler tube through the slits 9. This peering tube may be rested or secured in an adjustable position in any desired manner.

The operation of the device is as follows: The tubular portion 3 is secured to the top of the pendulum by the socket 10. The Geissler tube 13 is placed behind the screen 12 and the peering tube 14 is adjusted in position so as to be on the line of sight through the slits 9 with the Geissler tube 13. The Geissler tube being in circuit with a small induction coil whose primary coil is connected with the battery through the necessary contact of a standard clock, the standard clock closes the circuit when its pendulum is at the lowest point of its swing, and the Geissler tube flash, if there is a co-incidence with the pendulum 1, that is if the pendulum 1 is also at the lowest point of its swing, will be seen by the observer through the peering tube 14 and the exact period of the pendulum determined, for except at a co-incidence of the two pendulums the flash of the Geissler tube can not be seen through the peering tube. It will be obvious that the longer the tube and the narrower the slits the greater the accuracy of the test. In practice it is found that a tube approximately ten centimeters long with slits approximately one millimeter wide gives good results.

While I have shown and described my device as tubular in form and in its adaptation to a Kater's pendulum, other forms and modifications may be made for connection and use with various clock pendulums without departing from the spirit or scope of my invention.

Having thus described my invention what I claim is:

1. A device for determining the period of a pendulum, comprising a tubular body secured to a pendulum in alinement and in combination with a Geissler tube and a peering tube.

2. A device for determining the period of a pendulum, comprising a Geissler tube, a peering tube, and a tubular body secured to a pendulum in alinement with said tubes; said Geissler tube being in circuit with a standard clock.

3. In a device for determining the period of a pendulum, the combination with a flash tube and a peering tube, of a hollow body adapted to be secured to a pendulum and having adjustable ends adapted to regulate the volume of flash ray in passing through said hollow body.

4. A device for determining the period of a pendulum, comprising a Geissler tube in circuit with a standard clock in combination with a device comprising a tubular body having a line of sight therethrough mounted on the pendulum.

5. A device for determining the period of a pendulum, comprising a Geissler tube in circuit with a standard clock, in combination with a tubular member having a line of sight therethrough mounted on the pendulum to be tested and a peering tube arranged in line with said line of sight.

6. In combination with a Geissler tube in circuit with a standard clock, a tubular member secured to the pendulum of a second clock, and slits in said member, said slits being spaced for causing a line of sight through said apparatus.

7. In combination with a Geissler tube in circuit with a standard clock, a tubular member secured to the pendulum of a second clock, adjustable slits in the ends of said member.

8. In combination with a Geissler tube in circuit with a standard clock, an apparatus secured to the pendulum of a second clock comprising a tubular portion, ends on said tubular portion having round holes therein, and means of adjusting the holes in said ends to straight slits of various sizes.

9. In a device for determining the period of a pendulum, a tubular member secured to the top of a pendulum, end pieces having round holes therein secured to said tubular member, and plates secured to said end pieces for normally covering a portion of said holes.

10. In a device for determining the period of a pendulum, a tubular member secured to the top of a pendulum, end pieces having round holes therein secured to said member, and adjustable straight edge plates mounted on said end pieces for providing adjustable straight slits in the ends of said member.

11. In a device for determining the period of a pendulum, a tubular member, end pieces having holes therein secured to said tubular member, and plates secured to said end pieces for normally covering a portion of said holes.

12. In a device for determining the period of a pendulum, a tubular member secured to a pendulum, end pieces having holes therein secured to said tubular member, and plates adjustably mounted on said end pieces for normally covering a portion of said holes.

13. In a device for determining the period of a pendulum, a tubular member having adjustable slits in its ends and secured to a pendulum, in combination with means for directing light rays into said tubular member at predetermined intervals.

In testimony whereof I hereto affix my signature in the presence of two witnesses.

OLIN L. WILLS.

Witnesses:
W. E. CRITCHLOW,
W. D. JAMIESON.